US012297078B2

(12) United States Patent
Zabran et al.

(10) Patent No.: US 12,297,078 B2
(45) Date of Patent: May 13, 2025

(54) MAGNETIC DOOR COUPLER

(71) Applicant: OTIS ELEVATOR COMPANY, Farmington, CT (US)

(72) Inventors: Mikhail Zabran, Farmington, CT (US); James Chmiel, Suffield, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/349,461

(22) Filed: Jul. 10, 2023

(65) Prior Publication Data

US 2025/0019207 A1 Jan. 16, 2025

(51) Int. Cl.
*B66B 13/12* (2006.01)

(52) U.S. Cl.
CPC .................................... *B66B 13/12* (2013.01)

(58) Field of Classification Search
CPC ...................................................... B66B 13/12
See application file for complete search history.

(56) References Cited

U.S. PATENT DOCUMENTS 5,174,417 A * 12/1992 Pilsbury .................. B66B 13/12 187/330
7,823,699 B2 * 11/2010 Gieras ................... B66B 13/165 187/331
9,362,037 B2 * 6/2016 Piech ...................... E05F 15/60
2009/0314588 A1 * 12/2009 Gieras ................... B66B 13/125 307/104
2010/0038187 A1 * 2/2010 Gieras ................... B66B 13/125 335/209
2010/0282546 A1 11/2010 Han et al.

FOREIGN PATENT DOCUMENTS

KR 100993465 B1 11/2010
KR 101831590 B1 2/2018
WO 2011075142 A1 6/2011
WO 2016030296 A1 3/2016

OTHER PUBLICATIONS

European Search Report for EP 24187119.3, Issued Nov. 26, 2024 in U321926EP, 9 pages.

* cited by examiner

*Primary Examiner* — Diem M Tran
(74) *Attorney, Agent, or Firm* — CANTOR COLBURN LLP

(57) ABSTRACT

A coupler device of a door coupler engageable with a vane member includes a housing, a shaft rotatable about an axis, and at least one rotary magnet arranged within an interior of the housing. The at least one rotary magnet is coupled to the shaft. The coupler device is transformable between an off configuration and an on configuration and the coupler device is magnetically couplable with the vane member when in the on configuration.

18 Claims, 8 Drawing Sheets

MAGNETIC DOOR COUPLER

BACKGROUND

Exemplary embodiments pertain to elevator systems, and more particularly, to a door coupler for opening a landing door when the elevator car is parked at a landing.

Elevators typically include a car that moves vertically through a hoistway between different floors of a building. A landing is associated with each floor of the building and the landing includes a set of landing doors arranged to close off the hoistway when the elevator car is not at that landing. The landing doors open with doors on the car to allow access to or from the elevator car when it is at the landing. It is necessary to have the landing doors coupled appropriately with the car doors to open or close them.

Conventional arrangements include a door interlock that typically integrates several functions into a single device. The interlock locks the landing doors, senses that the landing doors are locked and couples the landing doors to the car doors for opening purposes. While such integration of multiple functions provides lower material costs, there are significant design challenges presented by conventional arrangements. For example, the locking and sensing functions must be precise to satisfy codes. The coupling function, on the other hand, requires a significant amount of tolerance to accommodate variations in the position of the car doors relative to the landing doors. While these functions are typically integrated into a single device, their design implications are usually competing with each other.

Conventional door couplers typically include a vane on the car door and a pair of rollers on a landing door. The vane must be received between the rollers so that the landing door moves with the car door in two opposing directions (i.e., opening and closing). Common problems associated with such conventional arrangements are that the alignment between the car door vane and the landing door rollers must be precisely controlled. This introduces labor and expense during the installation process. Further, any future misalignment results in maintenance requests or call backs.

Additionally, with conventional arrangements debris build up on the door track and static pressure from the stack effect tend to impede the landing doors from fully closing. Moreover, with conventional designs, separately driving the landing doors closed causes delays in the door opening and closing times, which can appear to be an inconvenience to passengers.

BRIEF DESCRIPTION

According to an embodiment, a coupler device of a door coupler engageable with a vane member includes a housing, a shaft rotatable about an axis, and at least one rotary magnet arranged within an interior of the housing. The at least one rotary magnet is coupled to the shaft. The coupler device is transformable between an off configuration and an on configuration and the coupler device is magnetically couplable with the vane member when in the on configuration.

In addition to one or more of the features described herein, or as an alternative, in further embodiments the shaft is rotatable about the axis between the off configuration and the on configuration.

In addition to one or more of the features described herein, or as an alternative, in further embodiments the shaft is biased by a biasing member into the on configuration.

In addition to one or more of the features described herein, or as an alternative, in further embodiments the at least one rotary magnet is at a first position within the housing when in the off configuration and the at least one rotary magnet is in a second position within the housing when in the on configuration.

In addition to one or more of the features described herein, or as an alternative, in further embodiments in the off configuration, the at least one rotary magnet does not generate a magnetic field at an exterior of the housing and in the on configuration the at least one rotary magnet generates an external magnetic field.

In addition to one or more of the features described herein, or as an alternative, in further embodiments at least one permanent magnet positioned is within the housing.

In addition to one or more of the features described herein, or as an alternative, in further embodiments in the off configuration, the magnetic field of the at least one rotary magnet counteracts the magnetic field of the at least one permanent magnet and in the on configuration, the magnetic field of the at least one rotary magnet is compounded with the magnetic field of the at least one permanent magnet.

In addition to one or more of the features described herein, or as an alternative, in further embodiments the magnetic field of the at least one permanent magnet is insufficient to couple the coupler device to the vane member.

In addition to one or more of the features described herein, or as an alternative, in further embodiments a lever is rotatably fixed to the shaft and a biasing member operably coupled to the lever to bias the coupler device to the on configuration.

In addition to one or more of the features described herein, or as an alternative, in further embodiments a member is fixedly mounted to the shaft, the member being operably coupled to a door mover.

According to an embodiment, a method of operating a door coupler includes operating a door mover, moving a coupler device operably coupled to the door mover laterally into engagement with a landing vane, and transforming the coupler device from an off configuration to an on configuration. The coupler device is magnetically coupled to the landing vane in the on configuration.

In addition to one or more of the features described herein, or as an alternative, in further embodiments moving the coupler device operably coupled to the door mover laterally occurs in response to operating the door mover.

In addition to one or more of the features described herein, or as an alternative, in further embodiments transforming the coupler device from the off configuration to the on configuration includes biasing at least one rotary magnet of the coupler device from a first configuration to a second configuration.

In addition to one or more of the features described herein, or as an alternative, in further embodiments the biasing at least one rotary magnet of the coupler device to the second configuration includes rotating the at least one rotary magnet from a first position to a second position within a housing of the coupler device.

In addition to one or more of the features described herein, or as an alternative, in further embodiments the biasing at least one rotary magnet of the coupler device to the second configuration includes rotating the at least one rotary magnet from a first position where a magnetic field of the at least one rotary magnet is not present at an exterior of the coupler device to a second position where the magnetic field of the at least one rotary magnet is present at an exterior of the coupler device.

In addition to one or more of the features described herein, or as an alternative, in further embodiments transforming the coupler device from the off configuration to the on configuration includes rotating a shaft of the coupler device about its axis.

In addition to one or more of the features described herein, or as an alternative, in further embodiments rotating the shaft of the coupler device about the axis occurs in response to operating the door mover after the coupler device is engaged with the landing vane.

In addition to one or more of the features described herein, or as an alternative, in further embodiments rotating the shaft of the coupler device includes transmitting a force from the door mover to a connector fixedly mounted to the shaft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
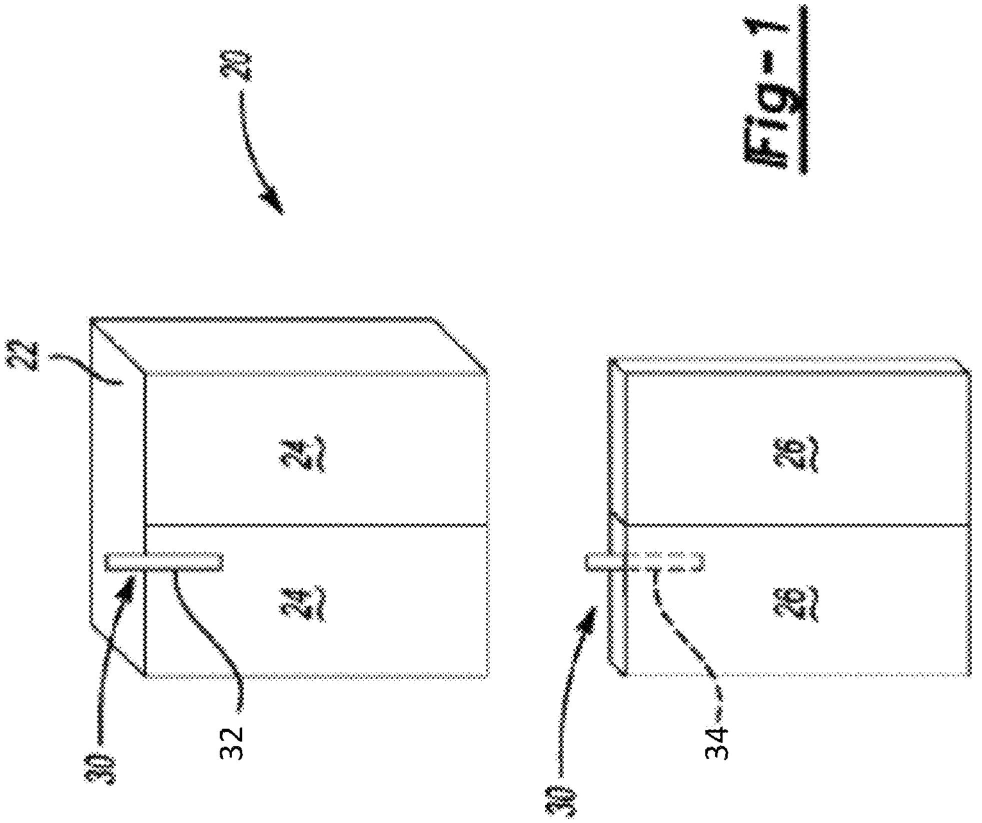
FIG. 1 is a schematic diagram of selected portions of an elevator system including a door assembly according to an embodiment.

With reference now to FIG. 1, select portions of an elevator system are illustrated. As shown, the elevator system includes an elevator car 22 that is movable within a hoistway in a known manner. The elevator car 22 includes at least one elevator car door 24 that is selectively movable between an open position and a closed position to provide access to the interior of the elevator car 22. At least one hoistway or landing door 26 is provided at a plurality of landings of the hoistway. An elevator door coupler 30 facilitates movement of the landing doors in combination with the elevator car doors 24. A coupler device 32 of the elevator door coupler 30 may be supported for movement with the one or more elevator car doors 24. Similarly, a vane member 34, such as a landing vane 34, for example, extends from and is movable with one of the landing doors 26. However, in other embodiments, the vane 34 may be arranged at the elevator car door 24 and the coupler device 32 may be arranged at a landing door 26. The coupling formed between the coupler device 32 and the vane 34 is operable to maintain the desired coordinated movement of the landing doors 26 with the elevator car doors 24.

Figure 2:
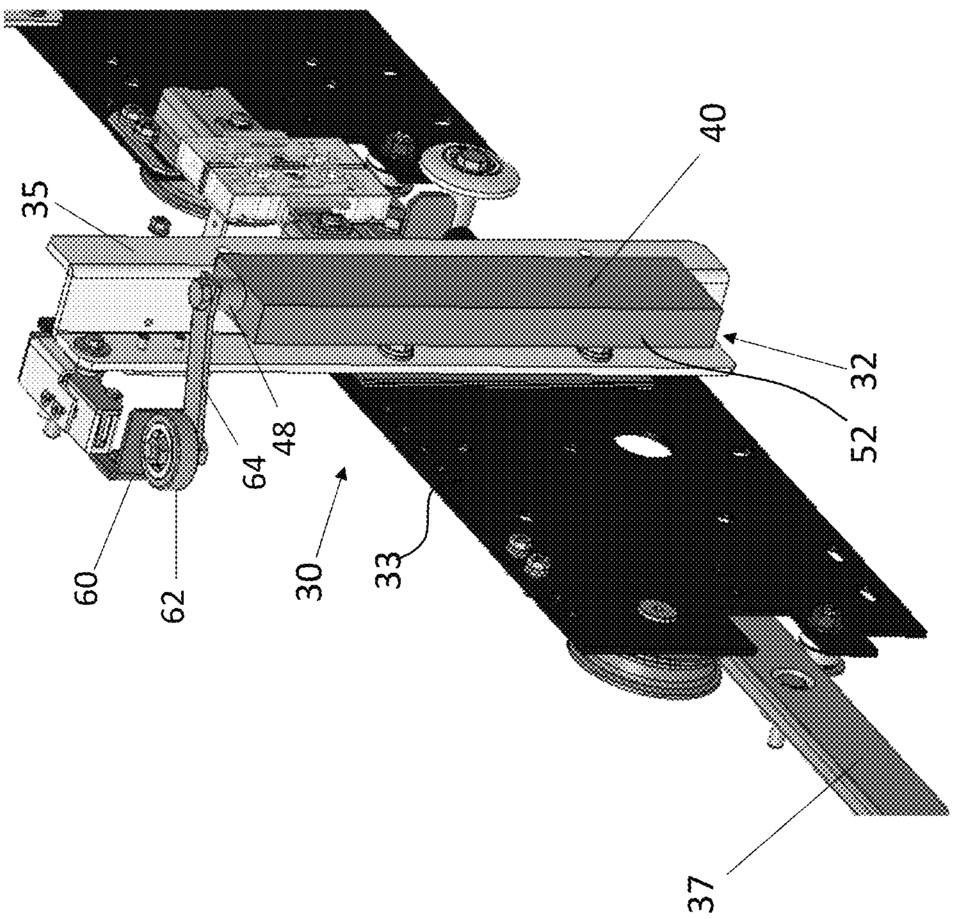
FIG. 2 is a perspective view of a door coupler mounted on a car door assembly according to an embodiment.
Figure 3:
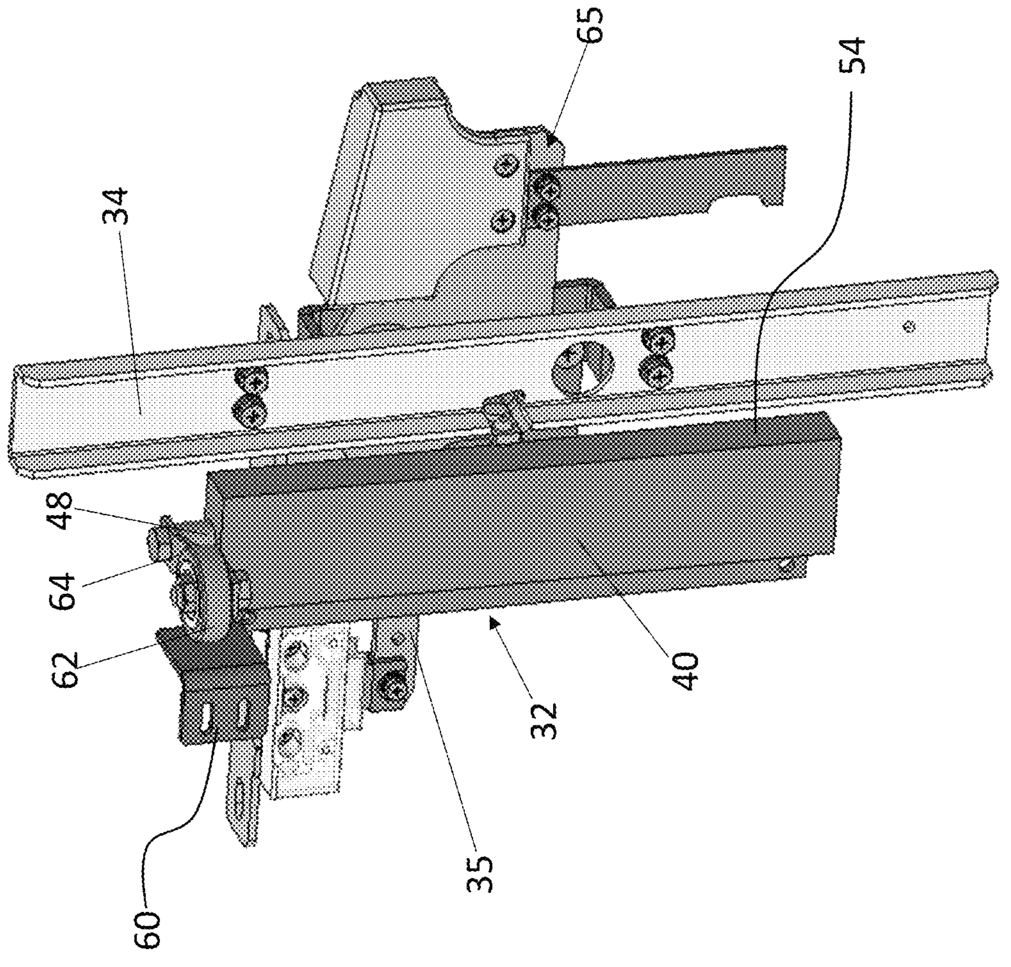
FIG. 3 is a perspective view of a door coupler including a magnetic coupler device and a landing door interlock according to an embodiment.

With reference now to FIGS. 2 and 3, the elevator door coupler 30 is illustrated in more detail according to an embodiment. Although not shown, the coupler device 32 is coupled with a movable portion of a door mover so that the coupler device 32 moves with an elevator car door 24. In an embodiment, the coupler device 32 is affixed to a door hanger 33 of the elevator car doors 24, such as via a mounting bracket 35 for example. The door hanger 33 is movable along a track 37 in a known manner, in response to operation of a door mover, for example driven by a motor. Accordingly, the coupler device 32 moves with the door hanger 33 in response to operation of the door mover.

Figure 4B:
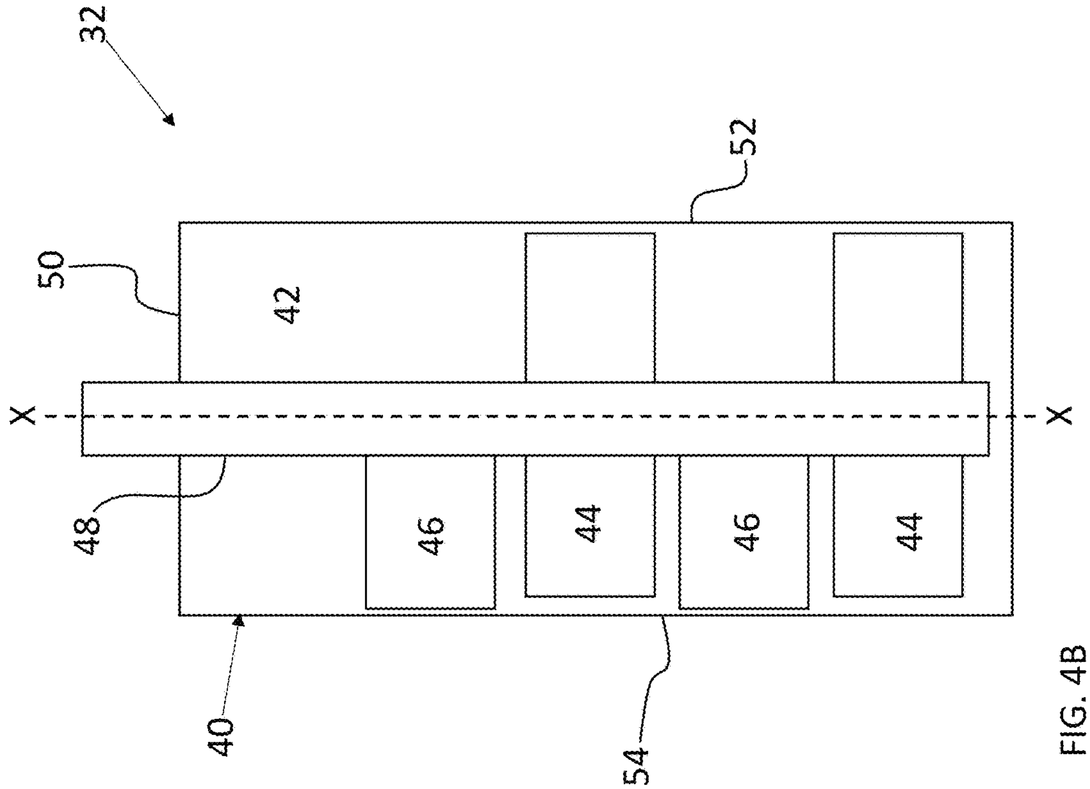
FIG. 4B is a schematic diagram of a magnetic coupler device having a rotary magnet in a second configuration according to an embodiment.
Figure 4A:
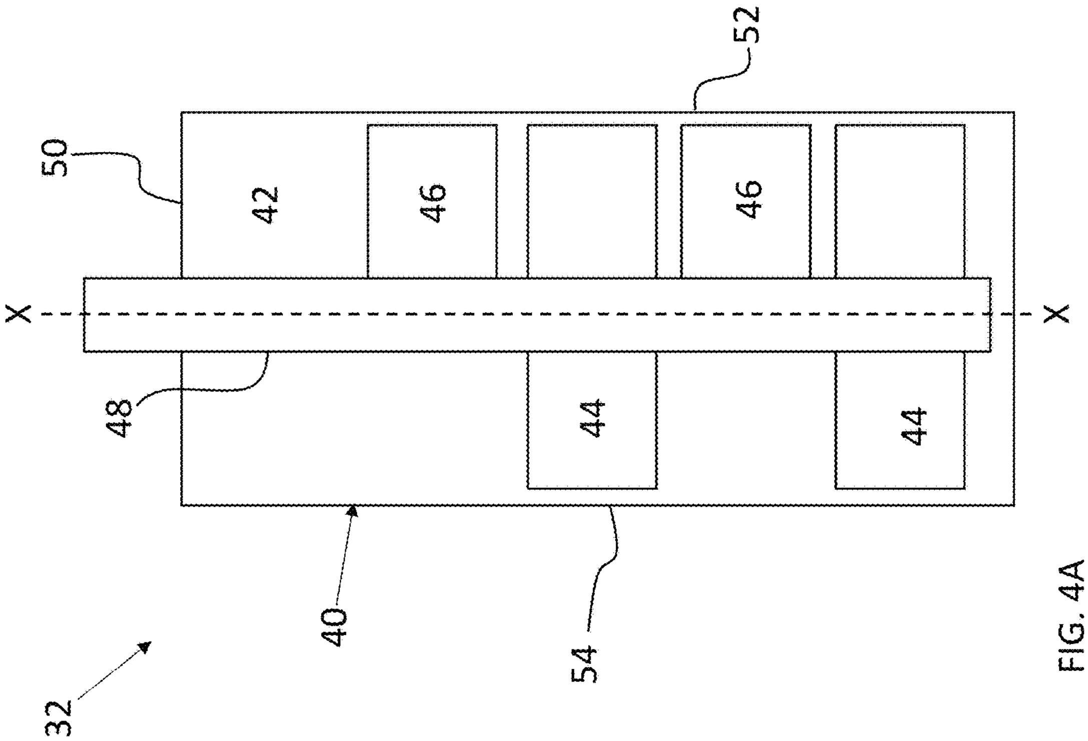
FIG. 4A is a schematic diagram of a magnetic coupler device having a rotary magnet in a first configuration according to an embodiment.

In the illustrated embodiments, the coupler device 32 is a magnetic device transformable between a first, off configuration and a second, on configuration. In an embodiment, when in the off configuration, the coupler device 32 is not magnetically attracted to an adjacent vane member, such as a landing vane 34, and when in the on configuration, the coupler device 32 is magnetically attracted to an adjacent landing vane 34. With reference now to FIGS. 4A and 4B, the coupler device 32 includes a body or housing 40 formed from a magnetic material. Arranged within the interior 42 of the housing 40 is at least one, and in some embodiments, a plurality of magnets. In an embodiment, the plurality of magnets includes at least one permanent magnet 44 and at least one rotary magnet 46. A rotary magnet 46 is transformable between a first configuration, such as shown in FIG. 4A for example, and a second configuration, such as shown in FIG. 4B for example. The at least one rotary magnet 46 may be operably coupled to a shaft 48 arranged within the interior 42 of the housing 40 and extending beyond a first end 50 of the housing 40. Accordingly, rotation of the shaft 48 about its axis X in a first direction is operable to transform the at least one rotary magnet 46 from the first configuration to the second configuration and rotation of the shaft 48 about its axis X in a second, opposite direction is operable to transform the at least one rotary magnet 46 from the second configuration to the first configuration.

In the non-limiting embodiment illustrated in FIGS. 4A and 4B, the physical location of the at least one rotary magnet 46 is altered in response to rotation of the shaft 48. For example, when in the first configuration (FIG. 4A), the rotary magnet 46 may be positioned adjacent to or face a first surface 52 of the housing 40 located furthest from the landing vane 34 and in the second configuration (FIG. 4B), the rotary magnet 46 may be turned away from the first surface 52 and/or positioned adjacent to or face a second, opposite surface 54 of the housing 40, located closest to or facing the landing vane 34. When the at least one rotary magnet 46 is in the first position, the magnetic field generated by the rotary magnet 46 is substantially absorbed or counteracted by the one or more permanent magnets 44 such that the magnetic field present at an exterior of the housing 40 is minimal or non-existent. When the at least one rotary magnet 46 is in the second position, the magnetic field generated by the rotary magnet 46 is compounded with the magnetic field of the at least one permanent magnet 44. Accordingly, in such embodiments, when the rotary magnets 46 are in the first position, the coupler device 32 is in an off configuration and when the rotary magnets 46 are in the second position, the coupler device 32 is in an on configuration.

In another embodiment, the one or more rotary magnets 46 are transformable between a first configuration in which the rotary magnet 46 does not generate an external magnetic field and a second configuration in which the rotary magnet 46 does generate a magnetic field present at an exterior of the housing 40. In such embodiments, when the rotary magnets 46 are in the first configuration, the magnetic fields generated by the rotary magnets 46 may be configured to counteract, and in some embodiments cancel, the magnetic fields of the permanent magnets 44. As a result, any magnetic field present at an exterior of the housing 40 is insufficient to attract an adjacent landing vane 34. When in the second configuration and the rotary magnets 46 do not generate an external magnetic field, the magnetic fields of the permanent magnets 44 are present at an exterior of the housing 40 and are sufficient to attract an adjacent landing vane 34. Accordingly, in such embodiments, when the rotary magnets 46 are in the first configuration, the coupler device 32 is in an off configuration and when the rotary magnets 46 are in a second position, the coupler device 32 is in an on configuration.

A biasing member (not shown), such as a torsion spring for example, may be operably coupled to the shaft 48 of the coupler device 32. The biasing force of the biasing member may be configured to rotate the shaft 48 about its axis X to bias the rotary magnets 46 into a second configuration such that the coupler device 32 is in an on configuration. In an embodiment, a retaining bracket 60 may be mounted to a portion of the elevator car door header, such as near the coupler device 32 when the elevator car doors are closed. When the elevator car doors 24 are closed, the retaining bracket 60 is operably coupled to the shaft 48 and opposes the biasing force of the biasing member, thereby retaining the shaft 48 and the magnets in the first configuration. In an embodiment, best shown in FIGS. 3, and 5-6, a roller 62 is fixedly mounted to the shaft 48, such as via a lever 64 for example, such that the roller 62 rotates about the axis X with the shaft 48. The roller 62 may be aligned with the retaining bracket 60 such that engagement between the roller 62 and the retaining bracket 60 holds the shaft 48 and the rotary magnets 46 in the first configuration.

Figure 5:
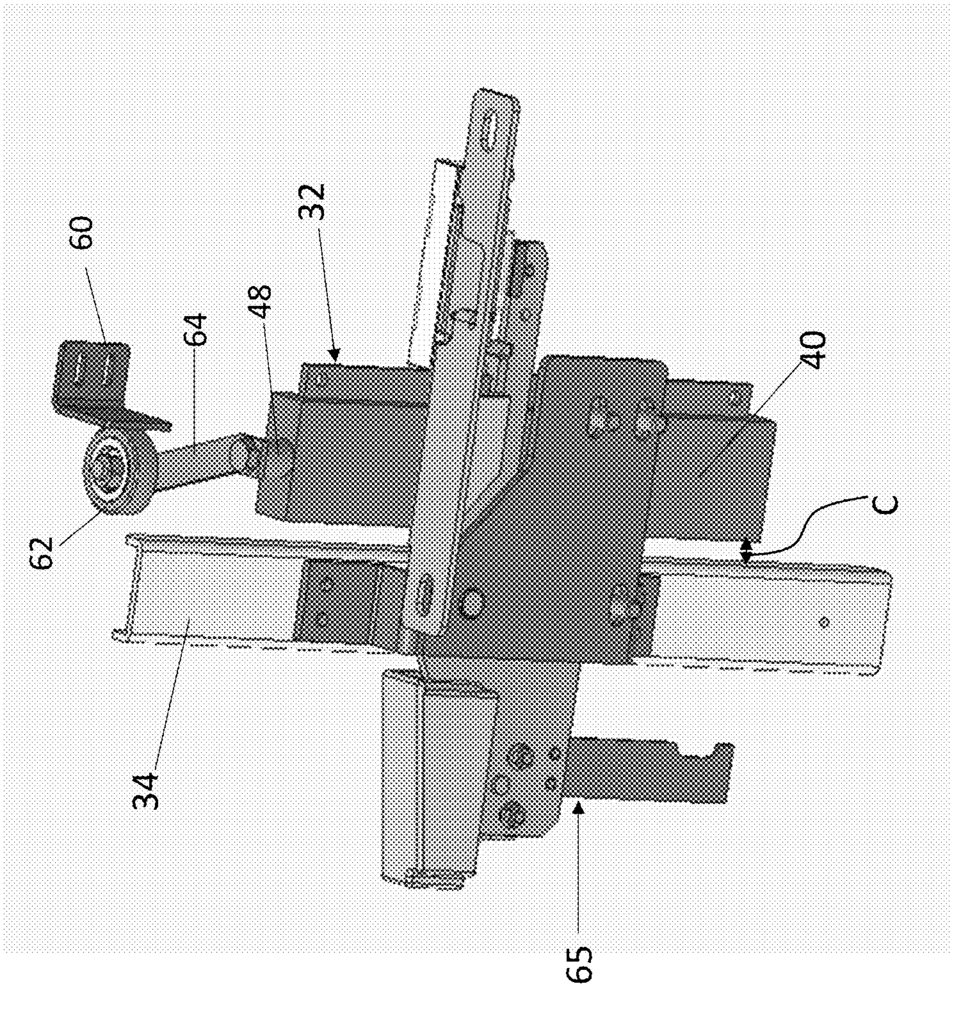
FIG. 5 is a perspective view of a door coupler including a magnetic coupler device separated from a landing vane by a clearance according to an embodiment.
Figure 6:
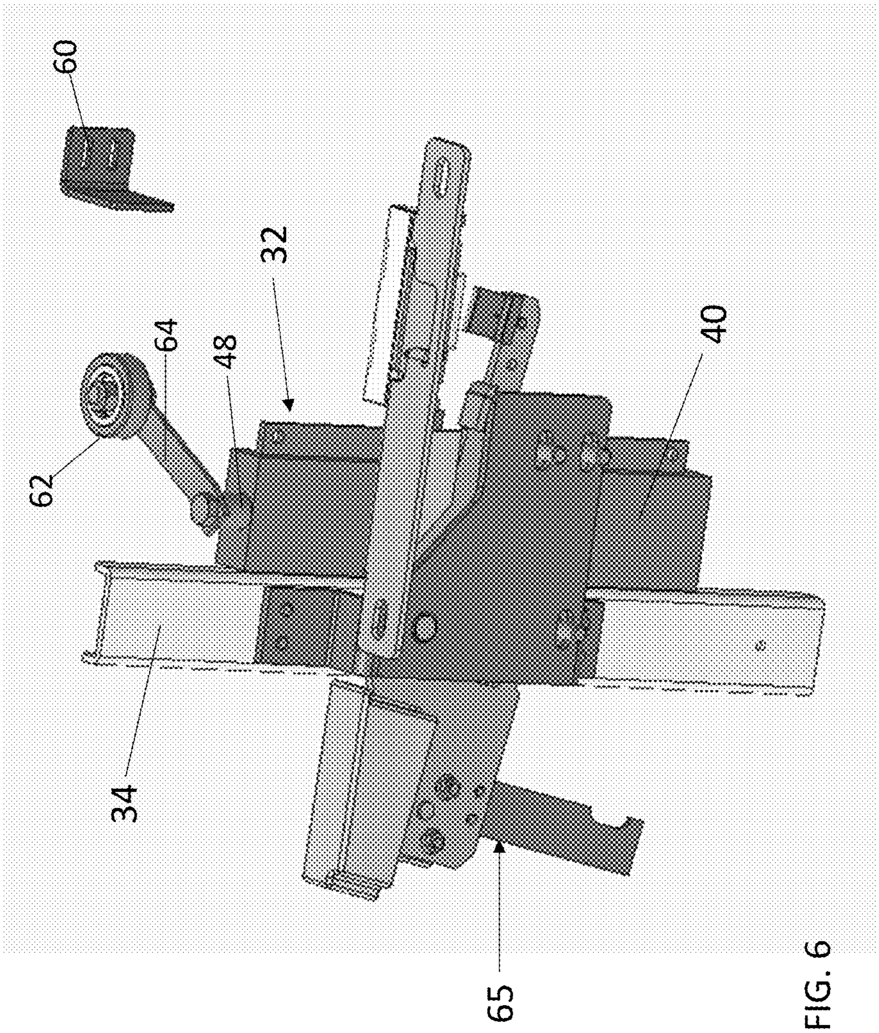
FIG. 6 is a perspective view of the door coupler of FIG. 5 with the magnetic coupler device magnetically coupled to the landing vane according to an embodiment.
Figure 7:
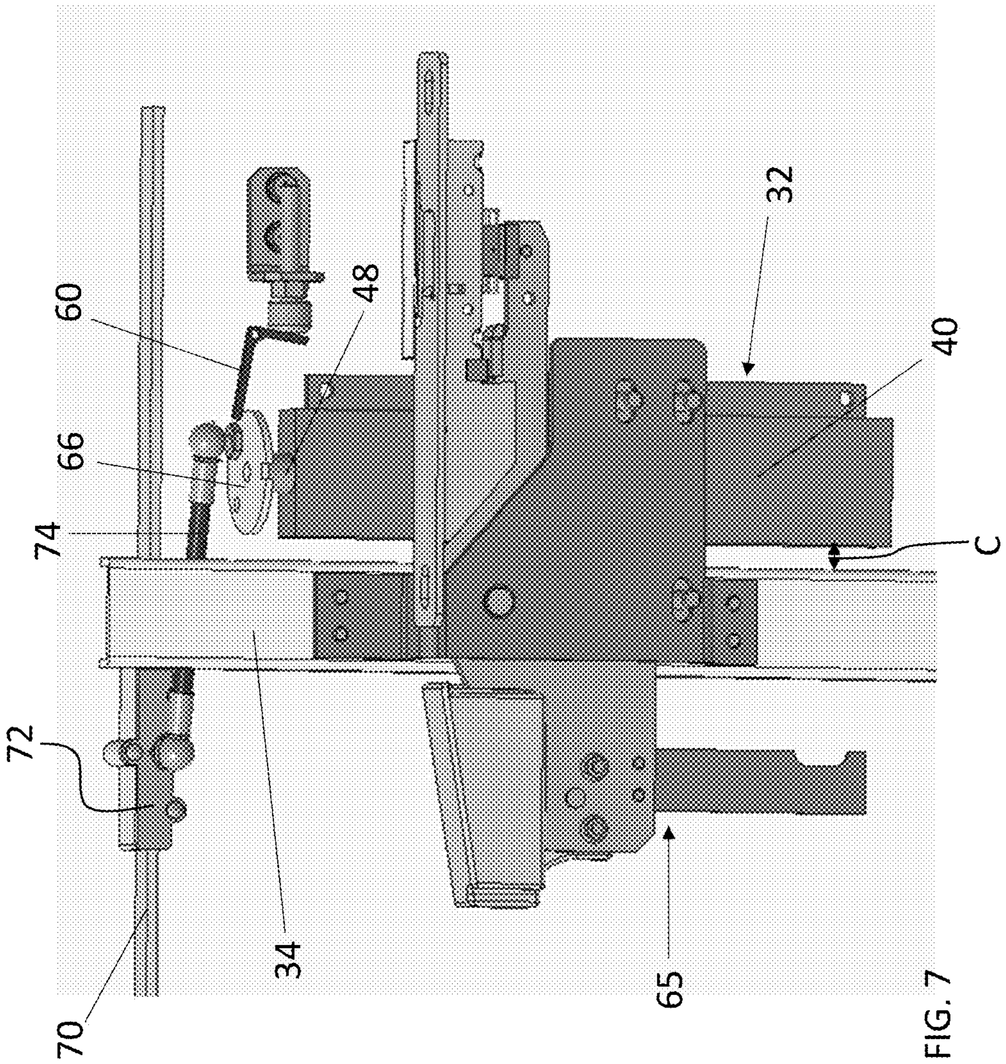
FIG. 7 is a perspective view of a door coupler including a magnetic coupler device separated from a landing vane by a clearance according to another embodiment.

During normal movement of the elevator car 22 within a hoistway, the coupler device 32 is in the first, off configuration. The coupler device 32 remains in this off configuration even when the elevator car 22 is initially parked at a landing of the hoistway. As best shown in FIGS. 5 and 7, the coupler device 32 is typically separated from the landing vane 34 by a clearance, C. Upon operation of the door mover, the coupler device 32 is moved laterally, towards the landing vane 34. If a landing vane 34 is not present, the coupler device 32 will continuously move with the door mover and the shaft 48 will rotate about its axis X to transform the coupler device 32 from an off configuration to an on configuration. However, when a landing vane 34 is present and generally aligned with a portion of the coupler device 32, operation of the door mover will move the coupler device 32 into contact with the adjacent landing vane 34 (FIGS. 5 and 7).

The lateral movement of the coupler device 32 toward the landing vane 34 moves the roller 62 out of engagement with the retaining bracket 60. As a result, the biasing force of the biasing member rotates the shaft 48 about its axis, thereby transforming the at least one rotary magnet 46 from the first configuration to the second configuration, and in turn transforming the coupler device 32 from the off configuration to the on configuration. In the on configuration, the housing 40 of the coupler device 32 is magnetically attracted to the landing vane 34.

Similar to existing door operators, further movement of the door mover may move the coupled coupler device 32 and landing vane 34 into engagement with a door interlock device (not shown), such as a door interlock roller for example. Further operation of the door mover once the coupler device 32 and landing vane 34 are arranged in engagement with the door interlock device cause a corresponding movement, for example rotation, of a door lock or latch assembly, shown generally at 65, to an unlocked position, thereby allowing the car doors to be opened.

Figure 8:
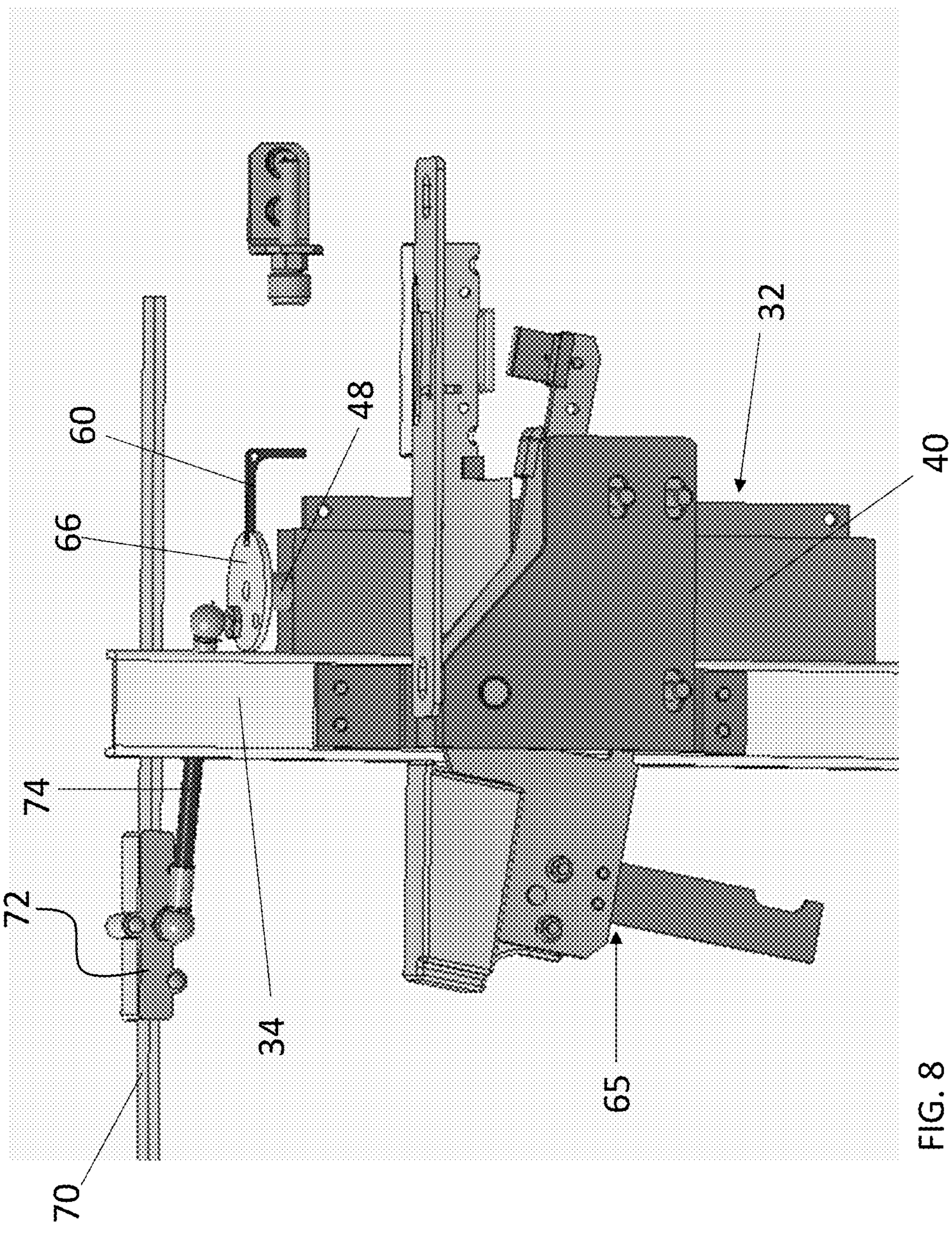
FIG. 8 is a perspective view of the door coupler of FIG. 7 with the magnetic coupler device magnetically coupled to the landing vane according to an embodiment.

With reference now to FIGS. 7 and 8, in another embodiment, a gear, wheel, or other movement member 66 is directly mounted to a portion of the shaft 48 at an exterior of the housing 40. In the illustrated, non-limiting embodiment, the door mover includes a belt drive 70; however, a door mover having another suitable configuration is within the scope of the disclosure. A bracket or other component 72 movable via the belt drive 70 may be operably coupled to the movement member 66, such as via a connector 74, for example. In an embodiment, movement of the bracket 72 is operable to transmit a force to the movement member 66, causing the wheel and the shaft 48 to rotate about the axis, X.

Similar to the previously described embodiment, during normal movement of the elevator car within the hoistway, the coupler device 32 is in an off configuration. With reference to FIG. 7, when the elevator car is parked at a landing, operation of the door mover applies a force to the coupler device 32. Initially the force transmitted from the movable bracket 72 to the movement member 66 moves the coupler device 32 laterally toward a landing vane 34. If a landing vane 34 is not present, the coupler device 32 will continuously move with the door mover without rotating the shaft 48. Accordingly, the coupler device will remain in an off configuration.

When a landing vane 34 is present and generally aligned with a portion of the coupler device 32, the force transmitted to the movement member 66 via the bracket 72 will move the coupler device 32 into contact with the adjacent landing vane 34 (FIG. 8). Once the coupler device 32 abuts the landing vane 34, the force transmitted to the movement member 66 as a result of further movement of the bracket 72 will rotate the movement member 66 and the shaft 48 about its axis X. This rotation transforms the coupler device 32 from the off configuration to the on configuration such that the housing 40 of the coupler device 32 is magnetically attracted to the landing vane 34. Similar to the previous embodiment, further movement of the door mover will move the coupled landing vane 34 and coupler device 32 to unlock a door latch in a known manner.

A door coupler 30 including a magnetic coupler device 32 as described herein does not require power to operate. Rather, the magnetic force used to attract the vane 34 is generated by at least one movable magnet. As a result, no modification of the hardware of the door controller will be required to operate the magnetic coupler device 32.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A coupler device of a door coupler engageable with a vane member, the coupler device comprising:

a housing;

a shaft rotatable about an axis; and at least one rotary magnet arranged within an interior of the housing, the at least one rotary magnet being coupled to the shaft;

wherein the coupler device is transformable between an off configuration and an on configuration in response to rotation of the shaft about the axis and the coupler device is magnetically couplable with the vane member when in the on configuration.

2. The coupler device of claim 1, wherein the shaft is rotatable about the axis between the off configuration and the on configuration.

3. The coupler device of claim 2, wherein the shaft is biased by a biasing member into the on configuration.

4. The coupler device of claim 2, wherein the at least one rotary magnet is at a first position within the housing when in the off configuration and the at least one rotary magnet is in a second position within the housing when in the on configuration.

5. The coupler device of claim 2, wherein in the off configuration the at least one rotary magnet does not generate a magnetic field at an exterior of the housing and in the on configuration in which the at least one rotary magnet generates an external magnetic field.

6. The coupler device of claim 5, further comprising at least one permanent magnet positioned within the housing.

7. The coupler device of claim 6, wherein in the off configuration, the magnetic field of the at least one rotary magnet counteracts the magnetic field of the at least one permanent magnet and in the on configuration, the magnetic field of the at least one rotary magnet is compounded with the magnetic field of the at least one permanent magnet.

8. The coupler device of claim 6, wherein in the off configuration, the magnetic field of the at least one permanent magnet present at is insufficient to couple the coupler device to the vane member.

9. The coupler device of claim 2, further comprising:

a lever rotatably fixed to the shaft; and a biasing member operably coupled to the lever to bias the coupler device to the on configuration.

10. The coupler device of claim 2, further comprising a member fixedly mounted to the shaft, the member being operably coupled to a door mover.

11. A method of operating a door coupler comprising:

operating a door mover;

moving a coupler device operably coupled to the door mover laterally into engagement with a landing vane; and transforming the coupler device from an off configuration to an on configuration, the coupler device being magnetically coupled to the landing vane in the on configuration, wherein the coupler device includes at least one rotary mounted affixed to a shaft and transforming the coupler device from the off configuration to the on configuration includes rotating the shaft about an axis.

12. The method of claim 11, wherein moving the coupler device operably coupled to the door mover laterally occurs in response to operating the door mover.

13. The method of claim 11, wherein transforming the coupler device from the off configuration to the on configuration includes biasing at least one rotary magnet of the coupler device from a first configuration to a second configuration.

14. The method of claim 13, wherein biasing at least one rotary magnet of the coupler device to the second configuration further comprises rotating the at least one rotary magnet from a first position to a second position within a housing of the coupler device.

15. The method of claim 13, wherein biasing at least one rotary magnet of the coupler device to the second configuration further comprises rotating the at least one rotary magnet from a first position where a magnetic field of the at least one rotary magnet is not present at an exterior of the coupler device to a second position where the magnetic field of the at least one rotary magnet is present at an exterior of the coupler device.

16. The method of claim 11, wherein transforming the coupler device from the off configuration to the on configuration further comprises rotating a shaft of the coupler device about its axis.

17. The method of claim 16, wherein rotating the shaft of the coupler device about the axis occurs in response to operating the door mover after the coupler device is engaged with the landing vane.

18. The method of claim 17, wherein rotating the shaft of the coupler device further comprises transmitting a force from the door mover to a connector fixedly mounted to the shaft.

* * * * *